United States Patent
Yang

(10) Patent No.: US 12,210,129 B2
(45) Date of Patent: Jan. 28, 2025

(54) RESERVOIR FLUID MAPPING IN MATURE FIELDS

(71) Applicant: Equinor Energy AS, Stavanger (NO)

(72) Inventor: Tao Yang, Stavanger (NO)

(73) Assignee: EQUINOR ENERGY, Stavanger (NO)

( * ) Notice: Subject to any disclaimer, the term of this patent is extended or adjusted under 35 U.S.C. 154(b) by 0 days.

(21) Appl. No.: 18/014,054

(22) PCT Filed: Jul. 2, 2021

(86) PCT No.: PCT/NO2021/050157
§ 371 (c)(1),
(2) Date: Dec. 30, 2022

(87) PCT Pub. No.: WO2022/005298
PCT Pub. Date: Jan. 6, 2022

(65) Prior Publication Data
US 2023/0314646 A1   Oct. 5, 2023

(30) Foreign Application Priority Data

Jul. 3, 2020   (GB) ...................................... 2010224

(51) Int. Cl.
*G01V 1/30* (2006.01)
*E21B 44/00* (2006.01)
*E21B 49/00* (2006.01)

(52) U.S. Cl.
CPC .............. *G01V 1/308* (2013.01); *E21B 44/00* (2013.01); *E21B 49/005* (2013.01); *E21B 2200/20* (2020.05); *G01V 2210/6122* (2013.01)

(58) Field of Classification Search
CPC .... E21B 44/00; E21B 49/005; E21B 2200/20; E21B 33/00; G01V 1/308
See application file for complete search history.

(56) References Cited

U.S. PATENT DOCUMENTS 4,208,906 A * 6/1980 Roberts, Jr. ........... E21B 47/107
                                                      702/9
5,531,164 A * 7/1996 Mosley ................... F42D 1/055
                                                      102/312
(Continued)

FOREIGN PATENT DOCUMENTS

WO   WO 2012/170987 A2   12/2012

OTHER PUBLICATIONS

British Combined Search and Examination Report under Sections 17 and 18(3) for British Application No. GB2010224.0, dated Mar. 29, 2021.
(Continued)

*Primary Examiner* — Kristyn A Hall
(74) *Attorney, Agent, or Firm* — Birch, Stewart, Kolasch & Birch, LLP

(57) ABSTRACT

A method of mapping reservoir fluid in a mature field includes identifying a region of interest within a hydrocarbon field, drilling a plurality of production wells through the region of interest, and collecting mud gas data as each production well is drilled. This mud gas data is used to generate a reservoir fluid property log, such as gas-oil ratio log, along a length of each of the production wells, which is in turn used to generate a refined model based on the 4D seismic data. The refined model permits better reservoir fluid mapping and has an improved vertical resolution at the region of interest than the first model of the field.

12 Claims, 3 Drawing Sheets

(56) References Cited

U.S. PATENT DOCUMENTS

| | | | |
|---|---|---|---|
| 6,267,185 B1* | 7/2001 | Mougel | E21B 47/12 |
| | | | 175/45 |
| 2009/0293605 A1* | 12/2009 | Evrard | E21B 49/005 |
| | | | 73/152.25 |
| 2012/0217067 A1* | 8/2012 | Mebane, III | E21B 44/02 |
| | | | 175/57 |
| 2015/0176373 A1* | 6/2015 | McGeoch | E21B 21/003 |
| | | | 166/227 |
| 2015/0247941 A1 | 9/2015 | Fiduk et al. | |

OTHER PUBLICATIONS

International Preliminary Report on Patentability and Written Opinion of the International Searching Authority for International Application No. PCT/NO2021/050157, dated Jan. 12, 2023.

International Search Report for International Application No. PCT/NO2021/050157, dated Oct. 7, 2021.

Pedersen et al., "Utilising Advanced Mud Gas Assessment SATLOG for De-Risking in Business Development," Society of Petroleum Engineers, 2019, URL: <https://doi.org/10.2118/198142-MS>, 14 pages total.

Yang et al., "A Machine Learning Approach to Predict Gas Oil Ratio Based on Advanced Mud Gas Data," Society of Petroleum Engineers, 2019, 17 pages total.

* cited by examiner

RESERVOIR FLUID MAPPING IN MATURE FIELDS

The present invention relates to the identification of viable hydrocarbon reservoirs, particularly within mature fields.

Today, about two-thirds of the world's oil production comes from mature fields. Whilst the term "mature field" has no single definition, it is commonly understood to refer to fields in which production has reached its peak and has now started to decline. Sometimes, a "mature field" is defined as one in which the cumulative production has exceeded 50% of the initial 2P (proved plus probable) resources.

Often, highly deviated and horizontal production wells are used to extract oil from mature reservoirs as the remaining oil reserves become difficult to access using vertical wells. Such wells can extract oil from a large area at comparatively low cost and can extend long distances horizontally, sometimes up to 10 km, and will pass through regions of the reservoir containing gases, such as gaseous hydrocarbons or injection gas, as well as regions of the reservoir containing liquid hydrocarbons.

Although a good understanding of the initial reservoir fluid distribution is obtained from early discovery and appraisal wells, the remaining oil distribution in a mature field is complicated after many years of production with measures like depletion, gas and water injection. The remaining oils are often segmented and comparatively expensive to recover. The key to production success in a mature field is to accurately identify oil targets that can be recovered using cheap wells, whilst avoiding free gas.

4D seismic analysis is used widely in mature fields. This is a form of time-lapse seismic analysis that comprises capturing 3D seismic survey data from a field at time-spaced intervals, often 6-month intervals, and examining changes in the data with time. Typically after the field has been in production for two or more years, sufficient seismic survey data will have been collected to allow for useful 4D seismic analysis to be carried out in order to track the changes in the reservoir fluid during production.

The use of multiple, time-spaced data sets also allows for a 3D model of the fluid distribution within the reservoir to be produced by updating the initial reservoir fluid distribution model to account for changes over time. However, 4D seismic interpretation does not provide quantitative reservoir fluid properties data, but rather a qualitative indication of fluid changes, caused by any one or more of pressure changes, density changes and saturation changes. Many assumptions must be made to interpret what these changes mean (e.g. gas displacing oil, or water displacing oil).

Furthermore, the practical vertical resolution of 4D seismic data is about 20-30 meters. Where oil reserves are highly segmented, this resolution can bring high uncertainties, especially for vertically thin layers.

Petrophysical logs are used extensively to identify reservoir fluid types. Density-neutron separation data presented in petrophysical logs can be utilized to distinguish oil and gas. However, density-neutron logs are responsive to both lithology and reservoir fluids and therefore, there are uncertainties related to the interpretation from petrophysical logs based on such data.

Techniques such as sampling while drilling, downhole fluid sampling, and downhole fluid analyser are not well suited to the horizontal production wells, due to the length of the wells and the fact that the wells are not oriented vertically.

When the 4D seismic data shows "brightening" in an area, it usually indicates a gas oil ratio (GOR) increase of reservoir fluids, assuming that pressure change is ruled out. However, due to the limitation of the 4D seismic technology, it has not previously been possible to accurately determine reservoir fluid property (e.g. GOR) in a particular reservoir layer.

It is undesirable to produce large quantities of free gas from an oil reservoir, such as solution gas or injection gas, because the unwanted production gas will typically be compressed and re-injected into the reservoir, which adds significant cost to the operation and leads to significant $CO_2$ emission. Consequently, "brightening" areas are often avoided when drilling new production wells.

Furthermore, even if a production well has been drilled in or near such a "brightening" area, it is usually desirable to perforate only the oil zones so that the well can be completed at low cost.

Due to the limitations of current technology, it has been necessary to take a conservative approach with reduced oil production and profitability in order to minimise the risk of a large gas breakthrough which might cost of the entire production well.

A need exists for a new technology to more accurately identify the remaining oil targets within a mature reservoir.

Viewed from a first aspect, the present invention provides a method comprising:
  identifying a region of interest within a hydrocarbon field based on a first model of the field produced using 4D seismic data;
  drilling a plurality of production wells through the region of interest, wherein mud-gas data is collected as each production well is drilled;
  generating a refined model of at least the region of interest based on the 4D seismic data and the mud-gas data, the refined model having less uncertain reservoir fluid mapping and/or greater vertical resolution at the region of interest than the first model of the field.

Mud-gas logging is a technique in which hydrocarbon gas is released from drilling mud at the surface and then examined. When drilling into the reservoir, a small quantity of the reservoir fluid will be carried in the drilling mud to the surface. At the surface, the drilling mud is processed to release a mixture of gases, known as "mud gas", which is then examined to estimate certain properties of the reservoir.

At reservoir conditions, the reservoir fluid can be reservoir gas or reservoir oil. Mud gas is principally comprises of light, gaseous fractions, which are usually from $C_1$ to $C_5$. Mud gas does not contain extensive information of oil components, which are usually $C_7$ to $C_{36+}$, and mud-gas data typically only comprises data relating to composition of $C_1$ to $C_5$ hydrocarbons.

Mud-gas logging is commonly used when drilling exploration wells in new fields in order to identify when a reservoir has been reached, for example to determine the origin of reservoir fluids. Its use is less common when drilling production wells in mature fields where the structure and the characteristics of the field is much better known from extensive data acquisition of early discovery and appraisal wells, 4D seismic survey, and production history from production wells.

Recent developments in mud-gas analysis mean that it is now possible to predict various reservoir fluid properties, such as gas-oil ratio, with a high degree of confidence based only on the $C_1$ to $C_5$ mud gas composition. This advantageously allows for a substantially continuous logs of the reservoir fluid properties to be generated along the length of a well, but without the need to interrupt the drilling process, as might be required for sampling while drilling.

Mud-gas logging can produce a resolution of about 1 meter, which is much greater than can be achieved using 4D seismic analysis, which typically has a resolution of about 20-30 meters. Thus, by combining the fluid properties from this log through the region of interest with the 4D seismic data, it is possible to improve the resolution of the fluid mapping within the region of interest. Additionally, the mud-gas data can be used to refine the assumptions made when interpreting the 4D seismic data to provide a more accurate map of the reservoir fluid.

The hydrocarbon field may be a mature hydrocarbon field. The hydrocarbon field may have undergone production for six or more months, optionally two or more years, and further optionally five or more years. The cumulative production of the hydrocarbon field may have exceeded 50% of the initial combined proven and probable oil reserves within the hydrocarbon field.

The hydrocarbon field may have undergone gas injection. The region of interest may comprise at least one gas-flooded reservoir.

The plurality of production wells may comprise at least one highly deviated or horizontal production well. A highly deviated well may comprise at least one section oriented at an angle greater than 60° with respect to vertical. A horizontal well may comprise at least one section oriented at an angle greater than 80° with respect to vertical, and preferably oriented substantially horizontally. Highly deviated and horizontal wells can be particularly important for mature wells in which the remaining oil reserves may become difficult to access using vertical wells.

The fluid type within the region of interest may be uncertain based on the first model. For example, the first model may indicate the probable presence of free gas within the region of interest, e.g. more likely than not or greater than 50% certainty that free gas is present. However, it may also indicate the possible presence of an oil reservoir, and preferably a viable oil reservoir. The precise degree of certainty that an oil reservoir is present required to justify drilling a production well is difficult to quantity, and is dictated by commercial factors. For example, the cost of drilling a production well compared to the potential revenue from exploiting the reservoir.

Whilst a single well mud-gas log will help to improve the fluid description along the well, depending on the reservoir complexity, several wells (e.g. at least four or five wells) throughout the region of interest are required to provide sufficient confidence as to the fluid mapping within region of interest.

The first model and/or the refined model may provide an estimated fluid type at each location within the field or region of interest. This may simply be an indication of whether there is liquid or gas present, or may provide a quantitative estimation of a fluid property (e.g. gas-oil ratio) at a particular location within the region of interest. Gas-oil ratio is particularly useful for identifying the viability of an oil reservoir as it is desirable to produce hydrocarbons only from reservoirs having a low gas-oil ratio.

It will be understood that a gas-oil ratio refers to a ratio between the quantity of gaseous hydrocarbon and the quantity of liquid hydrocarbon at surface conditions. The gas-oil ratio is preferably a volume ratio. The gas-oil ratio may be a single-flash gas-oil measurement. However, any suitable gas-oil measurement may be used.

Whilst, in theory, any mud-gas data could be used to improve the resolution of the model, the latest developments have been made using advanced mud-gas data. Thus, the mud-gas data preferably comprises advanced mud-gas data.

Advanced mud-gas data is a term of the art which refers to a mud-gas data collected and processed in a specific manner. Specifically, a recycling correction and an extraction efficiency correction have been applied to the data.

The recycling correction accounts for gases present within the drilling mud before injection into the well, such as from previous circulations of the drilling mud. This is usually measured by a second apparatus.

The extraction efficiency correction accounts for the different solubility of each of the gases within the particular drilling mud used, such that the compositions of the advanced mud-gas data correspond closely to the corresponding compositions of the reservoir fluid.

The method preferably comprises generating a reservoir fluid property log along a length of the well, for example comprising estimating a reservoir fluid property at a plurality of sample locations along the length of the well. The reservoir fluid property is preferably estimated using the mud-gas data. The refined model is preferably generated using the reservoir fluid property log. The estimation of the reservoir fluid property may use a computer model, and preferably a machine learning model. The reservoir fluid property may be a gas-oil ratio, a fluid density, or others which can be estimated from mud gas data.

The method may comprise completing one or more of the production wells in a comparatively low-cost manner. Optionally, the completion may comprise installing no inflow control devices. Inflow control devices are component installed as part of a well completion to help optimize production by equalizing reservoir inflow along the length of the wellbore.

This is possible because the refined model permits more accurate understanding of the reservoir composition. The possibility of using a low-cost completion may make reservoirs viable that otherwise would not be. For example, often multiple inflow control devices are installed along the reservoir section of the well, with each device employing a specific setting to partially choke flow. Inflow control devices are important where there is a risk of gas breakthrough. However, using the technique described above, they may no longer be required on certain wells in view of the additional knowledge gained.

The method may comprise determining one or more perforation locations within at least one of the production wells based on the refined model. That is to say, one or more locations where a casing of the production well is perforated to permit inflow of reservoir fluid. The perforation locations may be located in a horizontal section of the at least one of the production wells. By using the refined model, the reservoir fluid property of individual layers can be identified much more accurately, thereby allowing precise perforation of the layers comprising oil, whist avoiding perforation of layers comprising free gas. For example, the determining the one or more perforation locations may comprise determining that a gas-oil ratio at the location is below a predetermined threshold value based on the refined model.

The method may comprise determining one or more future production well locations based on the refined model. Optionally, the method may comprise drilling a production well at a location determined based on the refined model.

The method is preferably a computer-implemented method. Generating the refined model may comprise use of a machine learning algorithm and/or a machine learning model. For example, a machine-learning model may be used to interpret the mud-gas data, such as to generate a log of a particular fluid property.

Thus, viewed from a second aspect, the present invention also provides a computer program or a tangible computer-readable medium storing a computer program, wherein the computer program comprises computer-readable instructions that when executed will cause a computer to perform a process comprising:

identifying a region of interest within a hydrocarbon field based on a first model of the field produced using 4D seismic data;

receiving mud-gas data collected whilst drilling a plurality of production wells through the region of interest; and generating a refined model of at least the region of interest based on the 4D seismic data and the mud gas data, the refined model having less uncertain reservoir fluid mapping and/or greater vertical resolution at the region of interest than the first model of the field.

The process of the computer program may comprise any of the steps described above.

Certain preferred embodiments of the present disclosure will now be described in greater detail, by way of example only and with reference to the accompanying drawings, in which.

Figure 1:
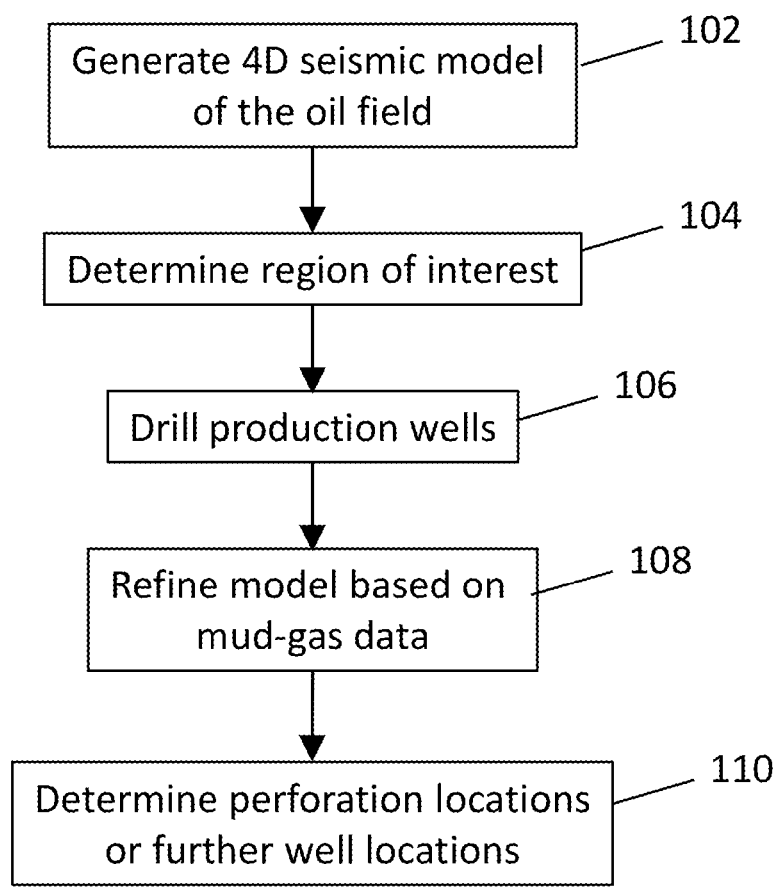
FIG. 1 shows a method according to an embodiment of the present disclosure.

A method in accordance with an embodiment of the disclosure is shown in FIG. 1, and will be described in greater detail with reference to FIGS. 2 and 3. The method seeks to determine the location of remaining oil reserves within an oil field, and particularly a mature oil field having segmented oil reserves.

First, at step 102, a 3D model of the oil field is generated based on all data available. The 3D model is determined using an initial reservoir fluid distribution model, which is then updated based on 4D seismic data collected over the lifetime of the oil field.

This 4D seismic data may be generated by acquisition and later analysis of sequentially acquired seismic surveys of the oil field. The seismic surveys may for example be acquired every 6 months. However, it will be appreciated that more or less frequent surveys may be carried out, as desired by the field operator. After the field has been in production for two or more years, sufficient seismic survey data will usually have been collected to allow for useful 4D seismic analysis to be carried out and to track the changes in the reservoir fluid during production. The time lapse acquisition of seismic data and the 4D seismic analysis can continue for as long as necessary in order to analyse the oil field over its lifetime.

Time-lapse seismic modelling of mature oil fields is commonplace, and it is expected that a 4D seismic model of the oil field will be readily available. The 4D seismic model is a three-dimensional model that preferably provides an estimated fluid type (gas, oil, and water) for each location within of three-dimensional space of at least part the oil field.

Figure 2:
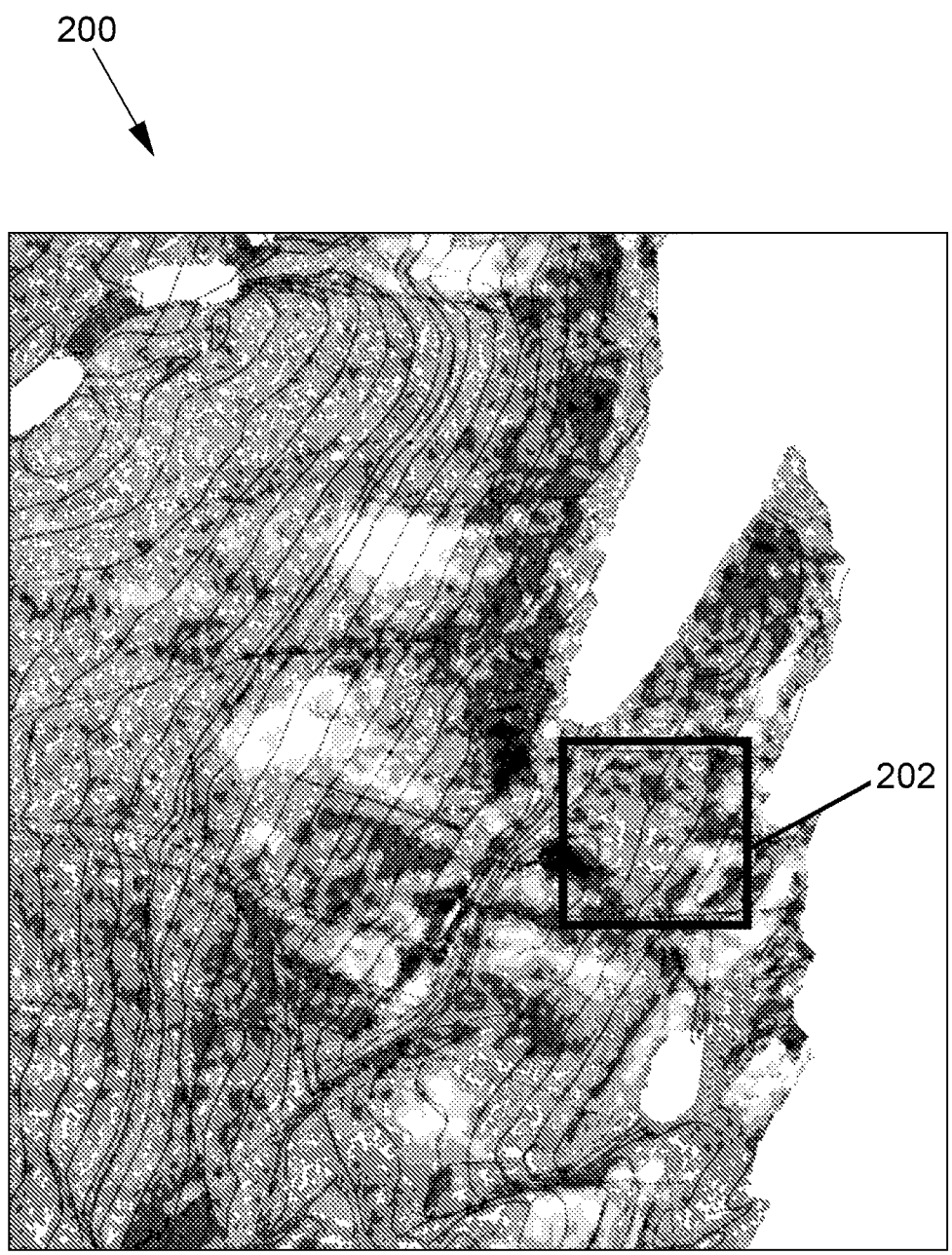
FIG. 2 shows a slice through a 4D seismic model of an oil field with a region of interest highlighted.

FIG. 2 illustrates an exemplary, horizontal slice 200 from a 4D seismic analysis of the oil field. This analysis shows changes in the composition within the oil-field over its lifetime. These changes can be caused by pressure changes, density changes or saturation changes, and certain assumptions are made in order to interpret what these changes mean.

In this example, dark regions indicate areas where the seismic amplitude has increased, suggesting that water has displaced oil, whilst light regions indicate areas where the seismic amplitude has decreased, suggesting that free gas has displaced oil. These areas of free gas are sometimes described as "gas brightening".

As can be seen, there are some areas of significant gas brightening within the oil field due to long time gas injection. Other areas, such as area 202, contain a smaller degree of gas brightening, but may potentially also contain viable oil reserves.

Conventional practice is to avoid any areas showing gas brightening when drilling new production wells. This is because they typically indicate the presence of free gas within the reservoir. Such free gas could be either solution gas, or injection gas. These areas are avoided because this unwanted free gas is typically compressed and re-injected into the reservoir, which adds additional operational costs and significant $CO_2$ emissions when producing from the well.

However, the 4D seismic model typically has a practical resolution of about 20-30 meters. In a heavily segmented oil field, reservoirs can form as thin layers having a thickness smaller than this resolution. Thus, a thin, oil-filled reservoir may be indistinguishable from an adjacent gas-filled space.

Furthermore, the seismic data relies on many assumptions, and so brightening may not necessarily indicate free gas where one or more of these assumptions is incorrect.

It is desirable to improve the accuracy and resolution of the model in order to identify viable oil reserves. For some reservoir zones, it is very challenging when 4D seismic interpretation indicates oil filling while the petrophysical logs give the opposite interpretation. It is highly desirable to have a source of data providing a ground truth answer for a decision on drilling and production.

At step 104, a region of interest 202 is identified based on the reservoir model and the 4D seismic data 200 where the reservoir fluid distribution at the location are uncertain. That is to say, where it is uncertain whether the region comprises reservoirs containing mainly free gas or one or more reservoir layers containing oil.

Next, at step 106, a plurality of production wells are drilled into the region of interest. In a mature oil field, the production wells will often be highly deviated or horizontal wells. Thus, sections of the production well may be oriented at an angle of at least 60 degrees to vertical. Whilst these production wells are being drilled, mud-gas data is collected.

Mud-gas logging entails gathering data from hydrocarbon gas detectors that record the levels of gases brought up to the surface in the drilling mud during a bore drilling operation. The composition of the gas may be examined for example with a gas chromatograph. The detection of the composition of the mud gas described below is sometimes referred to as "advanced mud-gas logging".

The composition of the mud gas can be examined in order to provide predictions of the $C_1$ to $C_5$ concentrations within the reservoir fluid. The measured mud-gas data is usually referred to as "raw" mud-gas data and is not comparable to the actual composition of the reservoir, since the mud gas contains gases that do not originate from the reservoir (e.g. gases present in the drilling mud or remaining from previous injection when recycling the drilling mud) and also because lighter hydrocarbon (e.g. $C_1$) are carried more easily by the drilling mud than heavier hydrocarbons (e.g. $C_2$ to $C_5$).

Firstly, a recycling correction is made to eliminate contamination of the gas by gases originating from previous injections of the drilling mud. This correction is applied based on a separate mud-gas measurement that was taken before the drilling mud was injected into the drilling string.

Secondly, an extraction efficiency correction step is applied to increase the concentration of intermediate components (from $C_2$ to $C_5$), such that the mud-gas data after this step closely resembles a corresponding reservoir fluid sample composition.

The mud-gas data after recycling correction and extraction efficiency correction is usually referred to as "fully corrected" or "advanced" mud-gas data.

Figure 3:
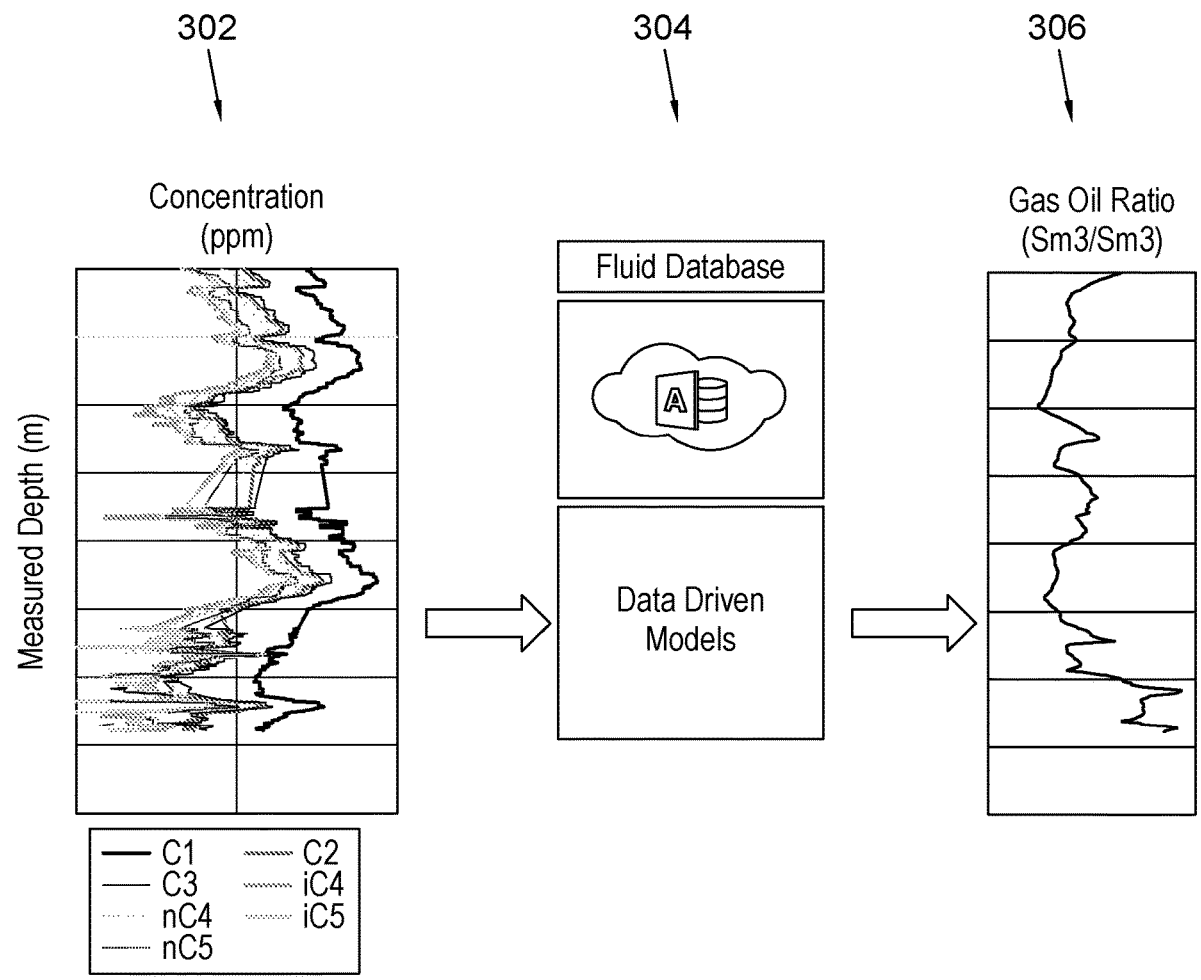
FIG. 3 shows a system for generating a gas-oil ratio log from measured mud-gas data.

Referring to FIG. 3, mud-gas data 302 can be collected substantially continuously during drilling so as to generate a substantially continuous log, and importantly does not require interruption of the drilling process. The log typically comprises a concentration of each of the $C_1$ to $C_5$ components of the mud-gas at each depth.

By using an advanced machine learning model 304 it is possible to predict various properties from the measured mud-gas data. In particular, the present inventor has developed a technique whereby fluid properties of reservoir fluid can be estimated with a high degree of accuracy, even where those properties are dependent upon the oil part ($C_{7+}$) of the fluid which is not measured by the mud-gas data.

Details of how the machine learning model may be trained to determine a gas-oil ratio of the reservoir fluid based on the measured mud-gas data can be found in the paper Tao Yang et. al. (2019), "A Machine Learning Approach to Predict Gas Oil Ratio Based on Advanced Mud Gas Data". Society of Petroleum Engineers. doi:10.2118/195459-MS.

By applying the machine learning model 304 to the mud-gas data 302, it is possible to generate a substantially continuous gas-oil ratio log 306. This would often have a resolution of about 1 meter, which is significantly higher than the 20-30 m resolution of the 4D seismic data.

Gas-oil ratio logs 306 will be generated from mud-gas data 302 collected during the drilling of each of a plurality of production wells within the region of interest 202. Based on these gas-oil ratio logs 306 it is possible to refine the assumptions made when interpreting the 4D seismic data 200 and to better understand what is being shown with greater precision, thereby allowing generation of a refined model covering at least the region of interest 202 that provides greater accuracy and a greater resolution, and in particular is sufficiently granular to identify oil reservoirs within the region of interest 202.

This new, refined model can be used for many purposes. However, the two primary purposes it may be used for are, as shown at step 110, to determine the locations for new wells, and to determine where to perforate the plurality of production wells discussed above.

Whilst the production wells may drill through the region of interest 200, hydrocarbons will only be produced where the casing of the well is perforated. The refined model can be used to determine with a high degree of confidence whether remaining oil is present within the region of interest 200, and precisely where it is located.

If viable oil reserves are identified by the refined model with a high degree of confidence, then the casing will be perforated at those locations to produce the oil. If no oil reserves are identified, or if a degree of confidence remains too low, then no perforations will be made to avoid the risk of a gas breakthrough. This represents a significant cost saving, as the completion of the well typically accounts for a greater proportion of the costs than the drilling of the well.

Advantageously, the refined model provides a much greater degree of confidence as to the reservoir fluid property in a new reservoir within a mature oil field. Thus, it may be possible to omit certain protective measures, e.g. inflow control devices, which would otherwise need to be included in view of the risk of breaching a reservoir containing free gas.

A second use of the refined model may be to determine locations for future production wells. Where a plurality of wells are drilled, it is possible to interpolate between the logs for each of the existing production wells to determine further regions where oil reserves are likely. It has been found that this may be possible after about several production wells have been drilled depending on the complexity of the reservoirs, although the accuracy of the model improves as more wells are drilled.

It will be appreciated that mud-gas data may be logged when drilling these further production wells to generate a further refined model of the area of interest, as well as to determine where to perforate those further production wells.

Whilst preferred embodiments have been described above, it will be appreciated that these have been provided by way of example only, and the scope of the invention is to be limited only by the following claims.

The invention claimed is:

1. A method comprising:
   identifying a region of interest within a hydrocarbon field based on a first model of the field produced using 4D seismic data;
   drilling a plurality of highly deviated or horizontal production wells through the region of interest, the highly deviated production wells comprising at least one section oriented at an angle greater than 60 degrees with respect to vertical;
   collecting mud-gas data substantially continuously during drilling as each production well is drilled by analyzing hydrocarbon gas released from drilling mud at the surface;
   generating a continuous gas-oil ratio log for each of the plurality of production wells based on the mud-gas data, each continuous gas-oil ratio log comprising a concentration of each of the C1 to C5 components of the mud-gas at each depth of the respective production well; and
   generating a refined model of at least the region of interest based on the 4D seismic data and the continuous gas-oil ratio logs, the refined model having less uncertain reservoir fluid mapping and/or greater vertical resolution at the region of interest than the first model of the field,
   the method further comprising:
      determining, using the refined model, if there is oil present in the region of interest and the locations of any remaining oil in the region of interest; and
      interpolating between the continuous gas-oil ratio logs to determine further regions where oil reserves are likely and drilling further production wells at the determined further locations.

2. The method according to claim 1, wherein a fluid type within the region of interest is uncertain based on the first model.

3. The method according to claim 1, wherein the first model indicates the probable presence of free gas within the region of interest.

4. The method according to claim 1, wherein the plurality of production wells comprises at least four production wells.

5. The method according to claim 1, wherein the first model provides an estimated fluid type at each location within the field.

6. The method according to claim 1, wherein the refined model provides an estimated fluid type at each location within the region of interest.

7. The method according to claim 1, wherein the mud-gas data comprises advanced mud-gas data.

8. The method according to claim 1, further comprising:
generating a fluid density log along a length of the well using the mud-gas data,
wherein the refined model is generated based on the reservoir fluid property log.

9. The method according to claim 1, further comprising:
completing one or more of the production wells, wherein the completion does not comprise installing any inflow control devices.

10. The method according to claim 1, further comprising:
determining one or more perforation locations within at least one of the production wells based on the refined model.

11. The method according to claim 1, further comprising:
determining a location for a future production well based on the refined model; and
drilling a production well at the location determined based on the refined model.

12. A non-transitory computer program or a tangible computer-readable medium storing a computer program, wherein the computer program comprises computer-readable instructions that when executed will cause a computer to perform a process comprising:
identifying a region of interest within a hydrocarbon field based on a first model of the field produced using 4D seismic data;
receiving mud-gas data collected whilst drilling a plurality of highly deviated or horizontal production wells through the region of interest, wherein mud-gas data is collected as each production well is drilled by analyzing hydrocarbon gas released from drilling mud at the surface to estimate certain properties of the reservoir fluid, wherein the highly deviated production wells comprise at least one section oriented at an angle greater than 60 degrees with respect to vertical;
generating a continuous gas-oil ratio log for each of the plurality of production wells based on the mud-gas data, each continuous gas-oil ratio log comprising a concentration of each of the C1 to C5 components of the mud-gas at each depth of the respective production well; and
generating a refined model of at least the region of interest based on the 4D seismic data and the continuous gas-oil ratio logs, the refined model having less uncertain reservoir fluid mapping and/or greater vertical resolution at the region of interest than the first model of the field,
the method further comprising:
determining, using the refined model, if there is oil present in the region of interest and the locations of any remaining oil in the region of interest; or
interpolating between the continuous gas-oil ratio logs to determine further regions where oil reserves are likely.

* * * * *